United States Patent [19]
Dukatz et al.

[11] Patent Number: 5,474,357
[45] Date of Patent: * Dec. 12, 1995

[54] INTEGRATED CHILD SEAT FOR VEHICLE

[75] Inventors: Matthew E. Dukatz, Bloomfield Hills; Fred C. Kresky, Rochester Hills; Jeffrey T. Lambert, Northville; James P. Lezotte, Redford; Robert W. Murphy, Farmington Hills; George S. Popa, Troy; Ronald S. Zarowitz, West Bloomfield, all of Mich.

[73] Assignees: Chrysler Corporation, Auburn Hill, Mich.; Atoma International, Inc., Ontario, Canada

[ * ] Notice: The portion of the term of this patent subsequent to Jul. 6, 2010, has been disclaimed.

[21] Appl. No.: 80,703

[22] Filed: Jun. 24, 1993

Related U.S. Application Data

[63] Continuation of Ser. No. 932,597, Aug. 30, 1992, Pat. No. 5,224,756, which is a continuation of Ser. No. 699,375, May 14, 1991, abandoned.

[51] Int. Cl.$^6$ .................................................. B60N 2/30
[52] U.S. Cl. .................... 297/238; 297/219.12; 297/408; 297/114
[58] Field of Search ................................ 297/218, 219.1, 297/229, 238, 250.1, 408, 410, 391, 114

[56] References Cited

U.S. PATENT DOCUMENTS

| | | |
|---|---|---|
| 1,965,048 | 7/1934 | Morris . |
| 2,337,480 | 12/1943 | Logan . |
| 2,436,294 | 2/1948 | Glatstein . |
| 2,584,481 | 2/1952 | Mast et al. . |

(List continued on next page.)

FOREIGN PATENT DOCUMENTS

| | | |
|---|---|---|
| 0258194 | 3/1988 | European Pat. Off. . |
| 0286542 | 10/1988 | European Pat. Off. . |
| 2665399 | 2/1992 | European Pat. Off. . |
| 2307673 | 11/1976 | France . |
| 2624805 | of 1989 | France . |
| 2454573 | 5/1975 | Germany . |

(List continued on next page.)

OTHER PUBLICATIONS

"Car Styling", Jan. 1982, drawings.
"Un Dispositif De Securite Pour Les Enfants Integre Au Vehicule", Renault News Release, Dec. 19, 1989.

(List continued on next page.)

*Primary Examiner*—Peter R. Brown
*Attorney, Agent, or Firm*—Cushman, Darby & Cushman

[57] ABSTRACT

A three-mode seat for a motor vehicle cooperable with an adult seat belt assembly to provide three modes of operation including an adult seat mode, a large child booster seat mode, and a small child mode. The seat includes a child's seat module arranged to be secured to the seat back frame between the space provided between two side cushions. The module includes a rigid back panel which carries a cushion assembly and a child's seat belt assembly. The cushion assembly includes a movable cushion assembly arrangement mounted for movement between (1) an adult mode position wherein the movable cushion assembly arrangement is disposed within the space between the side cushions and provides an adult back cushion for engaging the middle of the back of an adult seat occupant sitting on the seat cushion of the seat in an operative position, and (2) a child mode position wherein the movable cushion assembly arrangement extends from the space between the side cushions and the cushion assembly provides a cushioned child's seat extending from the bottom of the space in overlying relation to the seat cushion, a cushioned child's seat back extending upwardly from the cushioned child's seat within the space between the side cushions, and a cushioned child's head support above the cushioned child's seat back. The child's seat belt assembly is movable into a child's booster seat position enabling a large child to be retained therein by the adult seat belt assembly.

6 Claims, 8 Drawing Sheets

U.S. PATENT DOCUMENTS

| | | |
|---|---|---|
| 2,966,201 | 12/1960 | Strayler . |
| 3,094,354 | 6/1963 | Bernier . |
| 3,765,039 | 10/1973 | Ewolelt ............................ 297/219.1 X |
| 4,230,366 | 10/1980 | Ruda . |
| 4,533,176 | 8/1985 | Wyttenbach . |
| 4,540,216 | 9/1985 | Hassel, Sr. .............................. 247/236 |
| 4,541,654 | 9/1985 | Jonasson . |
| 4,555,135 | 11/1985 | Freeland . |
| 4,596,420 | 6/1986 | Vaidya . |
| 4,664,443 | 5/1987 | Casale . |
| 4,665,503 | 5/1987 | Kamijo et al. . |
| 4,690,455 | 9/1987 | Bailey et al. . |
| 4,695,092 | 9/1987 | Hittie ................. 297/219.12 |
| 4,722,568 | 2/1988 | Irvin . |
| 4,756,573 | 7/1988 | Simin et al. ......................... 297/236 X |
| 4,768,827 | 9/1988 | Musgrove . |
| 4,789,201 | 12/1988 | Selbert .................................... 297/218 |
| 4,892,769 | 1/1990 | Perdelwitz et al. ............ 297/219.12 X |
| 4,900,086 | 2/1990 | Steward . |
| 4,900,087 | 2/1990 | Crisp . |
| 4,913,498 | 4/1990 | Forlivio . |
| 4,936,627 | 6/1990 | Guim . |
| 4,936,631 | 6/1990 | Mochida et al. . |
| 4,943,112 | 7/1990 | Law . |
| 4,986,600 | 1/1991 | Leblanc et al. . |
| 5,026,118 | 6/1991 | Vander Stel et al. . |
| 5,088,747 | 2/1992 | Morrison ............................ 297/218 X |
| 5,100,199 | 3/1992 | Vander Stel et al. . |

FOREIGN PATENT DOCUMENTS

| | | |
|---|---|---|
| 7612141 | 9/1976 | Germany . |
| 2720954 | 12/1977 | Germany . |
| 2807064 | 2/1978 | Germany . |
| 3716038 | 12/1987 | Germany . |
| 59-156836 | 1/1984 | Japan . |
| 2023415 | 1/1980 | United Kingdom . |
| 2122886 | 1/1984 | United Kingdom . |
| 2167949 | 6/1986 | United Kingdom .................. 297/238 |

OTHER PUBLICATIONS

"Owner's Manual Supplement Operating Insturctions for Chrysler Integratd Child Seat", Chrysler Corporation, 1991, pp. 1–8.

Photograph, "Safely Hidden Away", 21591–S–P1, Chrysler Public Relations.

Photograph, "Toddler Tested for Two", 21591–S–P2, Chrysler Public Relations.

Photograph, "Safely Buckled In", 21591–S–P3, Chrysler Public Relations.

"Child's Safety Seat Wins Automotive Division Grand Awad", Auto Plastic News, vol. 21, No. 4, Dec. 1991.

"Chrysler Lauded for Child Safety Seat", MGA News, Feb. 1992.

"Chrysler Minivans Offer First Child Seats", Denver Post, Nov. 1, 1991.

"Safety Sells . . . Chrysler's Built–In Child Seats are Hot . . .", Detroit News, Apr. 15, 1992.

"Auto Motor und Sport", vol. 21, Oct. 2, 1992, pp. 62, 63, 64 and 66 and English translation thereof.

27 still pictures of a video tape showing the integrated child set designated "Atoma Integrated Child Seat"–Shot #1 through Shot #27, respectively.

INTEGRATED CHILD SEAT FOR VEHICLE

This is a continuation of application Ser. No. 07/932,597, filed Aug. 20, 1992, issued as U.S. Pat. No. 5,224,756 in turn a continuation of application Ser. No. 07/699,375, filed May 14, 1991 (now abandoned).

This invention relates to vehicle seats and more particularly to integrated seats for motor vehicles capable of being moved between an adult mode position and a child mode position.

Integrated seats which contemplate both a child and an adult mode are to be contrasted with the general practice which exists wherein the seats provided are adult seats and separate child seat units are used to accommodate children. The usual situation is that the separate units contain their own seat belt assemblies or occupant restraints and the separate child's unit is affixed to the existing adult seat by strapping the separate child unit to the adult seat by the adult seat belt assembly.

A characteristic of the separate child unit commercially available is that they are used for limited periods of time during the growth years. For example, it is usual to provide a separate infant unit which is used only during the first year or until the child reaches a weight of about twenty pounds. Thereafter, a different separate child's unit must be used. During the period from one year up to six or seven, the child's weight and dimensions increase significantly and the child's ability changes from one in which an adult must interface the child with the seat and restraint system to one in which the child becomes capable of interfacing with the seat and restraint system.

It is well known that separate child seat units present a measure of inconvenience in installation in that some time and effort is required to install the separate child's unit on the adult seat when it is desired to have the seat used by a child and to remove the installed child seat when it is desired to have the seat used by an adult.

The patented literature contains many proposals for eliminating this inconvenience inherent in the use of separate child seat units by providing an integrated seat structure capable of being easily and conveniently moved between an adult mode position and a child mode position. Examples of such patented literature include U.S. Pat. Nos. 4,540,216, 4,756,573, 4,900,087, 4,943,112, and 4,986,600, British Patent No. 2,023,415, and German Offenlegungsschrift 27 20 954.

As a lead up to the present invention, certain integrated child seats were made known to the public as prior art. These integrated child seats were constructed to include a vehicle seat comprising a frame assembly for securement within a vehicle including a seat frame assembly and a seat back frame assembly operatively connected with the seat frame assembly so as to be capable of being disposed in a fixed operative position with respect to the seat frame assembly. A seat cushion was carried by the seat frame assembly in a position to enable an adult occupant of the vehicle to sit thereon in an operative position. Side cushions were carried by the seat back frame assembly in positions to be engaged by opposite sides of the back of an adult seat occupant sitting on the seat cushion in the operative position with the seat back frame assembly in the fixed operative position. The side cushions were spaced apart a distance sufficient to define a child receiving space therebetween of a size to enable a child to be disposed therebetween. A plurality of cushion assemblies were mounted on the frame assembly including a movable cushion assembly mounted on the frame assembly for movement between (1) an adult mode position wherein the movable cushion assembly is disposed within the space between the side cushions and provides adult back cushions for engaging the back of an adult seat occupant sitting on the seat cushion, and (2) a child mode position wherein the movable cushion assembly extends from the space between the side cushions to provide a cushioned child's seat extending from the bottom of the space in overlying relation to the seat cushion and the plurality of cushion assemblies provides a cushioned child's seat back extending upwardly from the cushioned child's seat within the space between the side cushions, and a cushioned child's head support above the cushioned child's seat back. A child's seat belt assembly was disposed in operative relation with the seat back frame assembly and extended forwardly of the cushioned child's seat back for extension over the shoulders of a child sitting on the cushioned child's seat. The movable cushion assembly included a rigid seat structure and a structural connection between the rigid seat structure and the seat back frame assembly enabling the movable cushion assembly to be moved between the adult mode and the child mode positions. The rigid seat structure provided a rigid anchor point for the child's seat belt assembly between the legs of a child sitting on the cushioned child's seat.

Moreover, the plurality of cushion assemblies of the vehicle seat included a removable cushion pad assembly including a back section detachably fixed to the seat back support assembly forwardly thereof between the side cushions to provide therewith the cushioned child's seat back and a seat section hingedly connected with the seat back section detachably fixed to the movable cushion assembly of the vehicle seat to provide therewith the cushioned child's seat.

To date, these integrated child seats have not received any widespread acceptance. The present invention is based upon the underlying concept that in order for an integrated child seat to receive widespread acceptance it should be provided in vehicles which are popular as family vehicles or, specifically, vehicles which are frequently used to carry children. An example of a vehicle of this type is the well known van or minivan. Children are quite frequently transported in the middle bench seat of van vehicles. A problem presented in attempting to integrate one or more child seats in a van-type bench seat is that the back of the bench seat is quite low. The integrated child seats of the prior art have not dealt effectively with this problem, specifically the lead up integrated child seats. It is an object of the present invention to do so.

In accordance with the principles of the present invention, this objective is obtained by providing an improvement in the aforesaid lead up integrated child seats which includes an upper head cushion assembly provided as one of the plurality of cushion assemblies. The head cushion assembly comprises a rigid head structure, cushioning material carried by a rigid head structure and a releasable latching connection between the rigid head structure and the seat back frame assembly constructed and arranged to enable the head cushion assembly (1) to be releasably fixed in a child mode position above the seat back frame assembly and the upper extent of the side cushions carried thereby so that the rigid head structure and cushioning material carried thereby provide the cushioned child's head support and (2) to be moved and releasably fixed into an adult mode position disposed between an upper extent of the side cushions forwardly of the seat back frame assembly so that the rigid head structure and cushioning material carried thereby define an upper extent of the adult back cushions for engaging the back of an adult seat occupant sitting on the seat cushion.

Another object of the present invention is the provision of an integrated child seat of type described which is simple in construction, effective in operation and economical to manufacture and maintain.

These and other objects of the present invention will become more apparent during the course of the following specification and claims.

The invention can best be understood in conjunction with the accompanying drawings wherein illustrated embodiments are shown.

Referring now more particularly to the drawings, there is shown in FIGS. 1–4 thereof a three-mode seat, generally indicated at 10, embodying the principles of the present invention, the seat 10 being shown mounted on the floor 12 of a motor vehicle 14 in a position to cooperate with an adult seat belt assembly, generally indicated at 16, of the vehicle 14. The seat 10 shown is a two occupant bench seat of the type installed in the middle of a van type motor vehicle having a side entrance door (not shown) near the side of the seat, as shown. In the embodiment shown, the adult seat belt assembly 16 is carried by the left side of the vehicle 14 for cooperating with an occupant seated on the left operative position of the bench seat 10. As shown, the left operative position of the bench seat is provided with a child's seat module, generally indicated at 18, embodying the principles of the present invention. It will be understood that an additional, similar child's seat module 18 may also be provided in the right-hand operative position of the bench seat 10.

The child's seat module 18 of the present invention is suitable to be fixed to the seat back frame of any vehicle seat, including single, tandem, or three-occupant bench seats with fixed or movable seat backs. The two-occupant bench seat 10 shown is considered to be particularly desirable since it is a seat, which by virtue of the type of motor vehicle involved, will often be occupied by one or more children.

The two-occupant bench seat 10 presents particular requirements because of the relatively low back construction provided in conventional bench seats of this type heretofore utilized, when compared, for example, to the seat back in the back of a sedan type motor vehicle. It will be understood that many of the principles of the present invention are applicable to the higher back rear seats in sedan motor vehicles while some are applicable only to a low back seat, such as shown. For example, the child's seat module 18 of the present invention provides a child's head rest by a movable part of the cushion assembly whereas with an initial higher back construction the child's head rest may be provided by a non-movable part of the cushion assembly.

Figure 4:
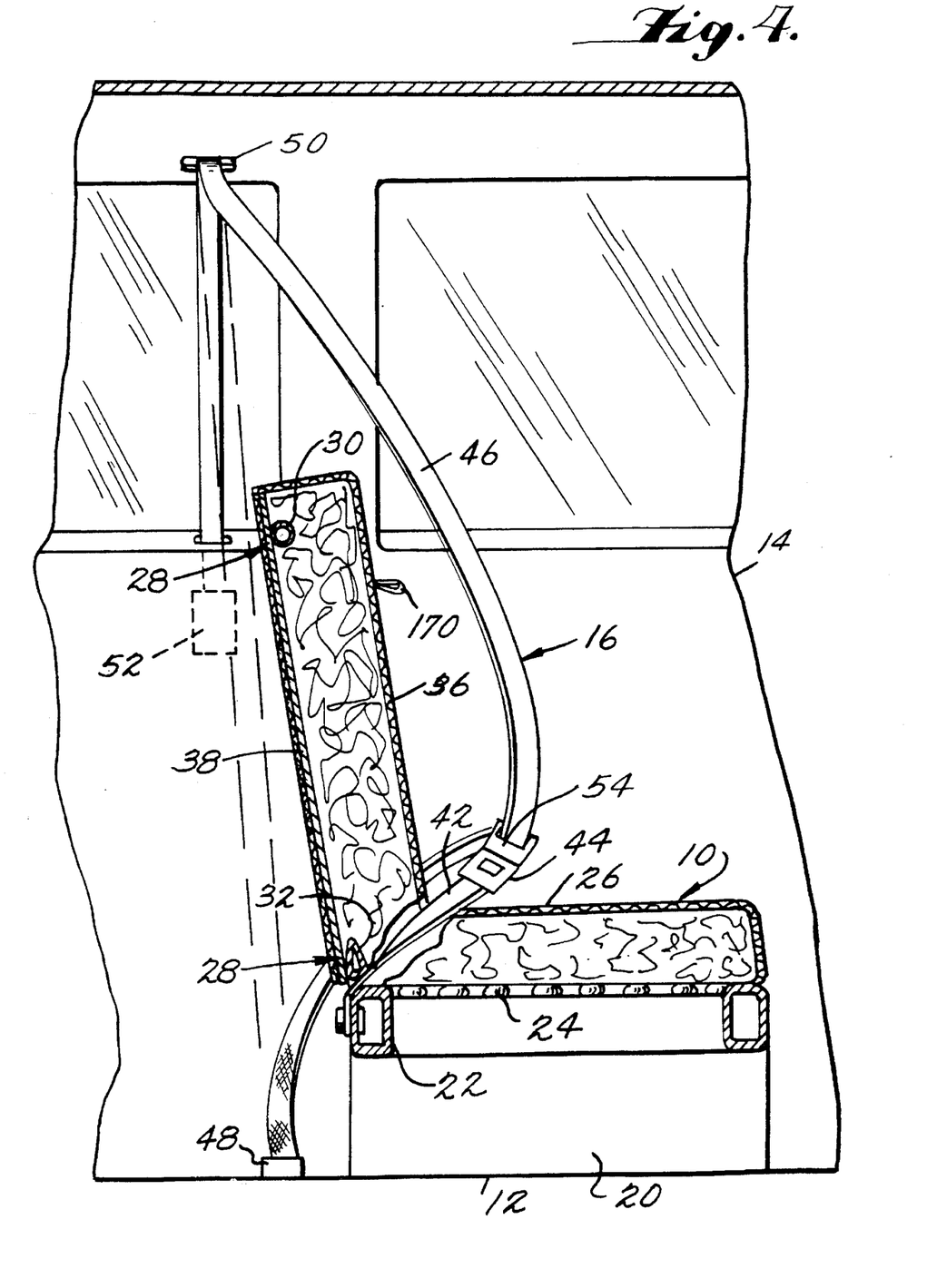
FIG. 4 is a vertical sectional view through the mid portion of the seat showing the cooperating connections of the adult seat belt assembly.

Referring now more particularly to FIG. 4, it will be noted that the two occupant bench seat 10 includes a pair of spaced risers 20 of conventional construction including lever actuated gripper assemblies (now shown) for releasably gripping floor cleats (not shown) so as to enable the seat 10 to be readily removed. Fixed to the upper ends of the risers 20 is a main seat frame 22 likewise of conventional construction. The main seat frame 22 is shown somewhat schematically in FIG. 4 as being a tubular rectangular peripheral structure having suitable springs 24 suspended in the open central position on which is supported a covered seat cushion 26 of conventional construction. As shown, the width of the seat cushion 26 is sufficient to enable two adult seat occupants to sit thereon in side-by-side operative positions.

The seat 10 also is provided with a seat back frame, generally indicated at 28, which also is preferably of conventional configuration. As shown, the seat back frame 28 includes a main inverted U-shaped frame member 30 positioned so that the lower free ends of the leg positions are rigidly fixed to the rearward sides of the main seat frame 22 and the central bight portion extends along the upper extent of the seat back. A lower tubular horizontal frame member 32 is welded or otherwise fixed between the leg positions of the main U-shaped frame member 30. Instead of the usual continuous cushioned sleeve which is extended over the seat back frame to form the seat back, the seat back is modified to accept the child's seat module 18. The description to follow will indicate the modifications necessary to install one child's seat module 18 in the left-hand operative position of the bench seat 10. It will be understood that the right-hand operative position can be similarly modified to install a second child's seat module 18 therein, if desired.

Figures 1, 2, 3:
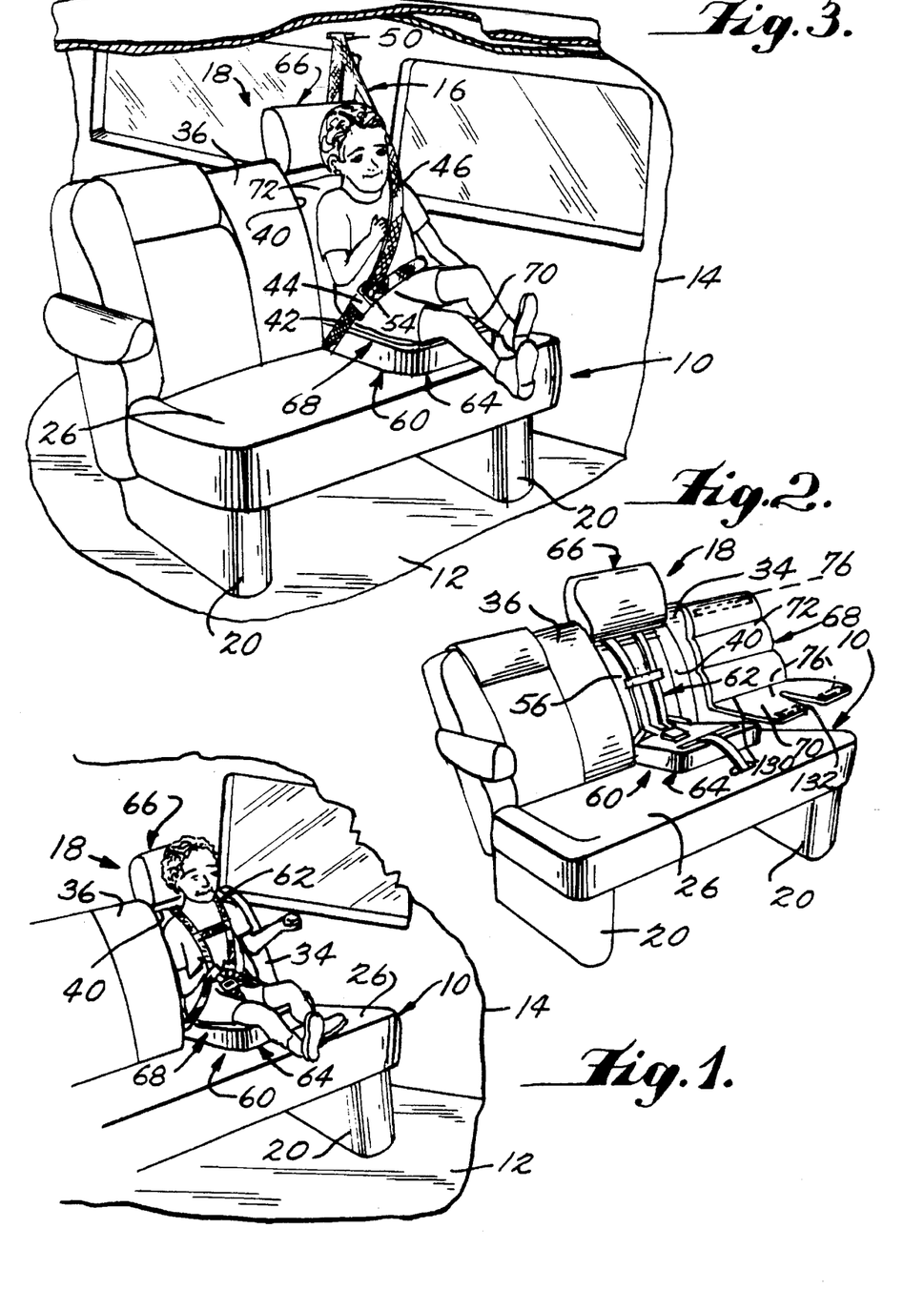
FIG. 1 is a fragmentary perspective view of a three-mode seat embodying the principles of the present invention showing the seat installed in a motor vehicle in cooperating relation with the adult seat belt assembly of the motor vehicle and disposed in its small child mode position with a small child therein.
FIG. 2 is a view similar to FIG. 1 showing how the child's seat belt assembly is moved into its booster seat position to enable the seat to act as a booster seat while in its child mode position.
FIG. 3 is a view similar to FIG. 1 showing the seat in its child mode position wherein the seat acts as a booster seat for a large child retained therein by cooperation with the adult seat belt assembly.

Referring to FIGS. 1–3, the modification required is to replace the normal seat back cushion mounted forwardly of the seat back frame 28 with a pair of side cushions 34 and 36 spaced apart a distance sufficient to fit a child therebetween. The side cushion 34 and 36 fixed forwardly of the frame 28 are suitably covered. A conventional backing 38 is provided rearwardly of the frame 28. The spacing between the side cushions 34 and 36 defines a space 40 between the side cushions 34 and 36 forwardly of the seat back frame 28 sufficient to receive a child therebetween and within which to mount the child's seat module 18.

Referring now to FIG. 4, it will be noted that the adult seat belt assembly 16 is mounted within the motor vehicle 14 in a position to cooperate with a seat occupant sitting on the left-hand operational position of the seat cushion 26. The adult seat assembly 16 can assume different configurations, however, as shown, the assembly 16 includes a belt section 42 fixed to the rearward central position of the main seat frame 22 and extending therefrom forward between the seat cushion 26 and the seat back side cushion 36. The belt section 42 carries a releasable buckle assembly 44 of conventional construction at its opposite end.

A main belt section 46 is anchored at one end to the floor, as indicated at 48, and extends therefrom over a fixed guide 50 mounted on the left side of the vehicle near the roof. From the fixed guide 50, the belt section 46 extends downwardly to a take up reel assembly 52 of conventional construction suitably mounted in the left side of the vehicle 14.

As best shown in FIG. 4, the extent of the belt section 46 extending from the floor anchor 48 to the roof guide 50 has a clip element 54 slidable thereon capable of being releasably engaged by the buckle assembly 44.

In accordance with usual procedure, an adult occupant in the left operative position on the seat cushion 26 is able to move the seat belt assembly 16 into operative relation by grasping the clip element 54 and bringing it across that seat occupant's chest into engaged relation to the buckle assembly 44. In this way, a lower extent of the belt section 46 between the floor anchor 48 and the clip element 54 extends over the seat occupant's waist and an upper extent of the belt section 46 between the clip element 54 and the fixed guide 50 extends across the left shoulder of the seat occupant.

Figures 5, 8:
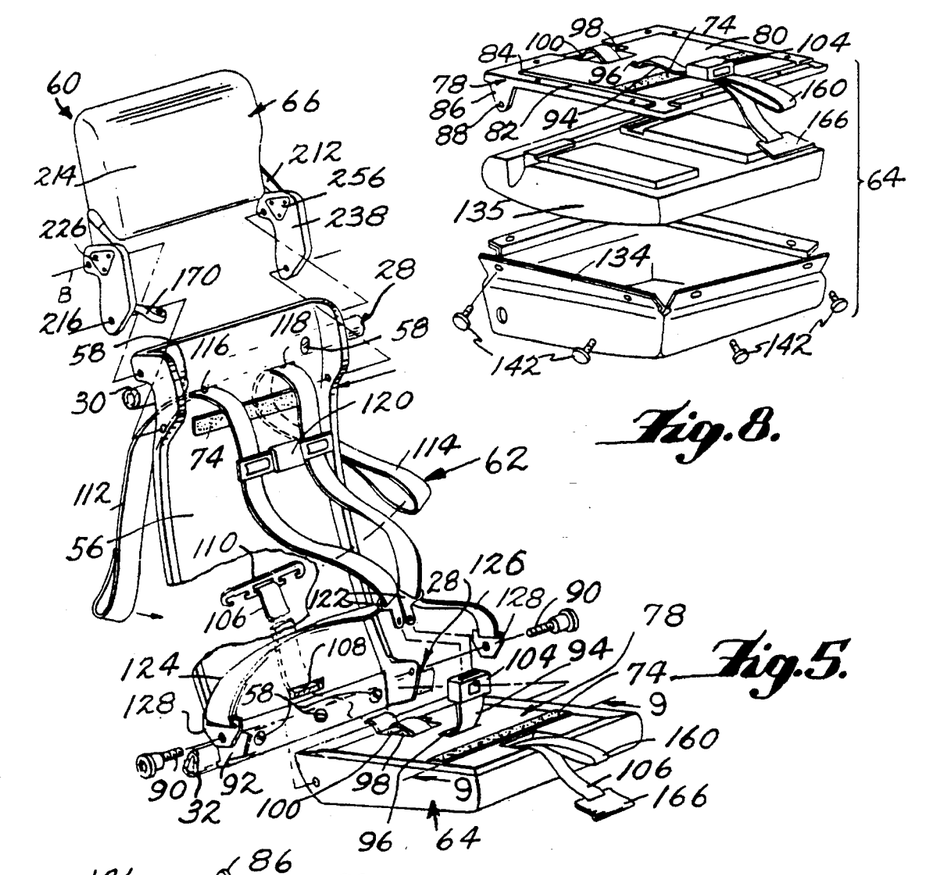
FIG. 5 is an exploded perspective view of a child's seat module embodying the principles of the present invention with the child's cushion pad removed to more clearly show the connection of the back panel of the module to the cross members of the seat back frame.
FIG. 8 is a fragmentary, exploded, perspective view of the lower movable cushion assembly of the module.

Referring now more particularly to FIG. 5, the child's seat module 18 is shown therein in exploded perspective so as to indicate the manner in which it is mounted on the seat back frame 28 between the side cushions 34 and 36. As shown, the module 18 includes a rigid structure, which in the broadest aspects of the present invention, may be regarded as part of the seat back frame. The rigid structure is in the form of a back panel 56 of rigid material, as, for example, a suitable moldable plastic material. As shown, the rearward surface of the back panel 56 is shaped to engage the forward portion of the frame member 30 extending horizontally across the upper rearward portion of the space 40 between the side cushions 34 and 36 and the forward portion of the lower frame member 32 extending horizontally across the lower rearward portion of the space 40. The back panel 56 is rigidly attached or affixed to the frame members 30 and 32 by suitable fasteners, as indicated at 58.

The child's seat module 18 also includes a cushion assembly, generally indicated at 60, carried by and connected with the back panel 56 and a child's seat belt assembly, generally indicated at 62, also carried by and connected with the back panel 56. In the preferred embodiment shown, the cushion assembly 60 is made up of a plurality of cushion assemblies including a lower movable seat cushion assembly, generally indicated at 64, an upper movable head cushion assembly, generally indicated at 66, and a cushion pad assembly or cushion pad, generally indicated at 68, now shown in FIG. 5, see FIG. 2. The movable cushion assemblies 64 and 66 of the child's seat module 18 are movable between (1) an adult mode position wherein the movable cushion assemblies 64 and 66 are disposed within the space 40 between the side cushions 34 and 36 and provide cushion means for engagement by the center of the back of an adult seat occupant sitting on the seat cushion 26 in the left hand operative position and (2) a child's mode position wherein the movable cushion assemblies 64 and 66 extend from the space 40. In the adult mode position, the movable cushion assemblies 64 and 66 have an appearance like that shown in FIGS. 1–3 in the seat back above the right-hand operative position. The child's mode position of the movable cushion assemblies 64 and 66 is shown in FIGS. 1–3 and it will be noted that the lower seat cushion assembly 64 extends from the bottom of the space 40 in overlying relation to the seat cushion 26 so as to provide, with a seat portion 70 of the cushion pad 68 detachably mounted thereon, a cushioned child's seat. A back portion 72 of the cushion pad 68 extends upwardly from the rearward end of the seat portion 70 and is detachably secured to the back panel 56 to provide a cushioned child seat back. The upper movable head cushion assembly 66 provides a cushioned child's head support above the cushioned child's seat back.

When a small child (e.g. between 20 and 40 pounds) is sitting on the cushioned child's seat with the child's back and head engaged against the cushioned child's back and head support, the child's seat belt assembly 62 of the module 18 is used as a restraint for the small child in the child's seat module 18. This relationship is shown in FIG. 1. The child's seat belt assembly 62 is movable into a child's booster seat position. FIG. 2 illustrates a step in accomplishing this movement. As shown therein, the cushion pad 68 is detachably mounted with respect to the lower seat cushion assembly 64 and the back panel 56. Any suitable means may be used to accomplish this detachable mounting. An exemplary embodiment is to utilize Velcro strips 74 as shown in FIG. 5 on the back panel 56 and lower seat cushion assembly 64 and registering cooperative Velcro strips 76 on the back of the cushion pad as shown in dotted lines in FIG. 2.

The child's seat belt assembly 62 is moved into the booster seat position by detaching the cushion pad 68, as shown in FIG. 2, and replacing it so that the child's seat belt assembly 62 is disposed rearwardly and beneath the cushion pad 68. In this way, the child's seat belt assembly 62 remains with the module 18 for use simply by detaching the cushion pad 68, deploying the child's seat belt assembly 62 and then replacing the cushion pad 68.

Referring now more particularly to FIG. 3, this Figure illustrates a larger child (e.g. above 40 pounds) sitting on the cushioned child's seat with the child's back and head engaging the cushioned child's back and head support of the module 18 when the child's seat belt assembly 62 is in its booster seat position. As shown, the module 18 acts as a booster seat for the larger child enabling the larger child to more conveniently see out of the vehicle windows and to more conveniently effect restraint by simply using the adult seat belt assembly 16, as is clearly shown in FIG. 3.

Figure 9:
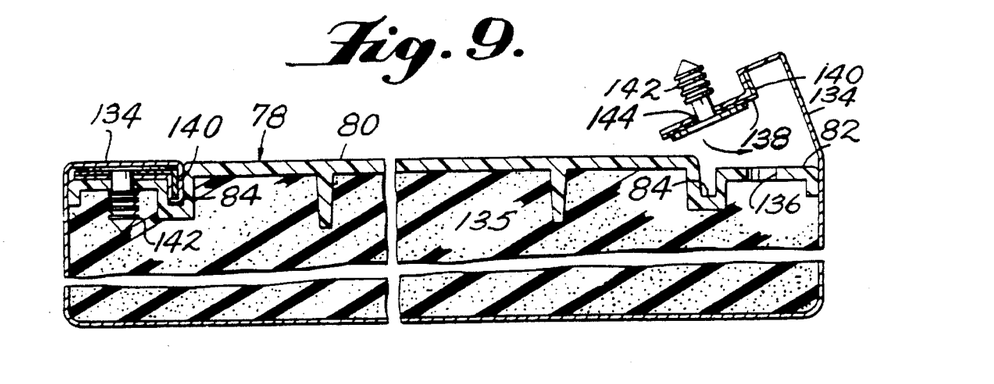
FIG. 9 is an enlarged cross-sectional view taken along the line 9—9 of FIG. 5.

Referring now more particularly to FIGS. 5–11, the specific construction of the movable seat cushion assembly 64 and the specific construction of the child's seat belt assembly 62 and the manner in which the seat belt assembly 62 cooperates with the movable seat cushion assembly 64 and the back panel 56, will now be described. As best shown in FIG. 8, the lower seat cushion assembly 64 includes a rigid structure, generally indicated at 78 in the form of a rectangular seat pad support platform molded of suitable structural plastic material. As best seen in FIG. 9, the rigid structure 78 has a central planar portion 80 bordered by a peripheral downwardly offset frame-like ledge portion 82 extending therearound. A trough or slot 84 is formed in the top surface of the rigid structure located a predetermined distance inside the outer perimeter thereof, providing a continuous boundary between the central portion 80 and the ledge portion 82, for a purpose to be described.

Figures 6, 7:
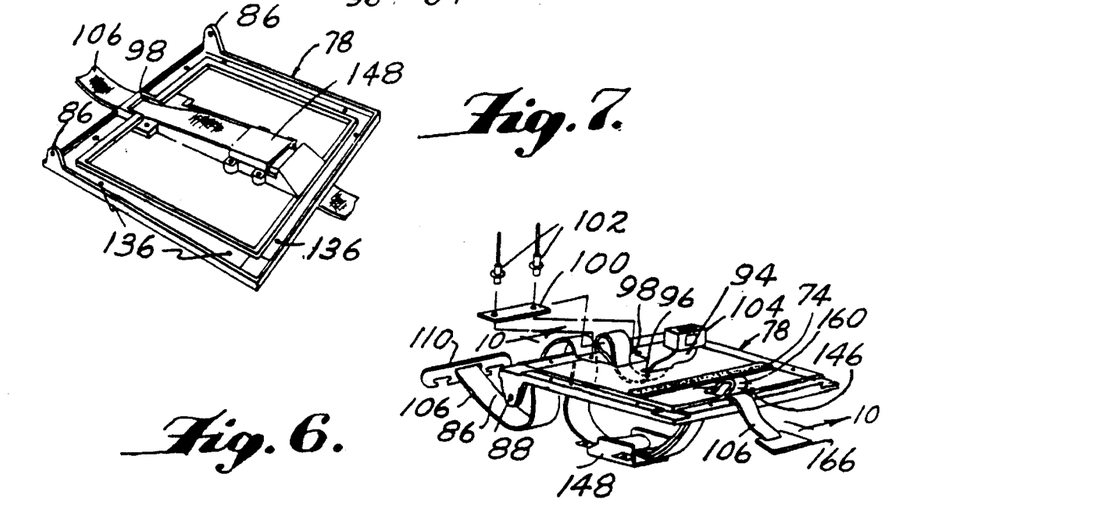
FIG. 6 is an exploded, perspective view of a portion of the lower movable cushion assembly of the child's seat module together with a portion of the five point safety harness constituting the child's seat belt assembly.
FIG. 7 is a perspective view of the underside of the rigid structure shown in FIG. 6.
Figure 10:
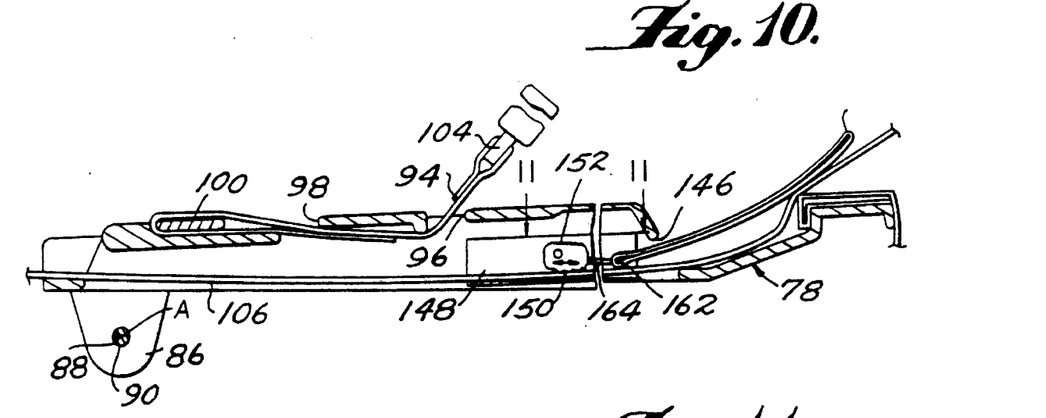
FIG. 10 is an enlarged cross-sectional view taken along the line 10—10 of FIG. 6.
Figure 11:
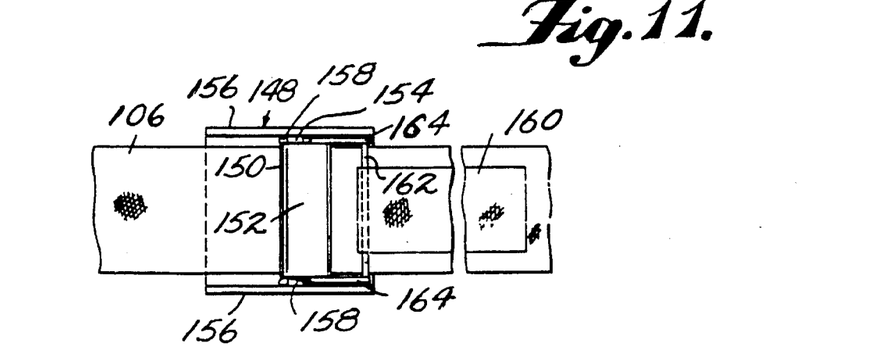
FIG. 11 is an enlarged cross-sectional view taken along the line 11—11 of FIG. 10.

As best shown in FIGS. 6, 8 and 10, a pair of perpendicularly extending mounting flanges 86 are formed adjacent the rear corners of the rigid structure 78 with axially aligned openings 88 formed therein. The openings 88 are adapted to having suitable fasteners 90 (FIG. 10) extended therethrough to pivotally secure the rigid structure 78 to suitable mounting brackets 92 (FIG. 12) fixedly secured to extend from the module back panel 56.

A crotch belt section 94 extends longitudinally beneath the rigid structure 78, and thence upwardly through central and rear openings 96 and 98, respectively, formed therein, to be secured at the rear end thereof by a suitable mounting bracket or plate 100. The bracket 100 is secured to the rigid structure 78 by suitable fasteners 102 (FIG. 6). A conventional seat restraint belt buckle assembly 104 is secured to the exposed forward end of the crotch belt section 94.

As shown in FIG. 5, a single seat belt 106 extends through a slotted lower opening 108 formed adjacent the bottom of the back panel 56 and is connected to a child safety restraint harness including a dividing bracket 110 and a pair of twin shoulder belts 112 and 114 extending through respective openings 116 and 118 in the back panel 56 and thence through a releasably interconnected guide member 120 and slotted ends of a pair of opposite hand connector members 122. The latter are adapted to be releasably connected to the buckle assembly 104. Extensions 124 and 126 of the respective belts 112 and 114 are each secured at one end thereof by brackets 128 to the mounting flanges 86 through mounting brackets 92. The extensions 124 and 126 serve to mount over the child's thighs.

The cushion pad 68 has the seat and back portions 70 and 72 connected by a flexible hinge 130 and a rectangular cut-out opening 132 is formed in the seat portion 70 for mounting around the crotch belt 94 out of the rigid structure 78. The upper edge of the back portion 72 fits against the back panel 56 up to a point just below the openings 116 and 118.

As shown in FIG. 9, an outer cloth or other "fabric" surface material, such as vinyl or leather, cover 134 is wrapped around a foam cushion 135 of the cushion assembly 64. A plurality of spaced holes 136 are formed in the rigid structure 78 intermediate the trough 84 and the edges of the ledge portion 82. An L-shaped retainer assembly comprising a flat retainer leg 138 and a right-angle foot flange 140 formed on the inner edge thereof, and suitable fasteners 142, such as pine-tree type push-in plastic fasteners, extend through openings 144 formed at spaced intervals along the center line of the retainer leg 138, and thence through the cover 134 into the cushion 135. The fasteners 142 are aligned with, and snap into, the ledge portion holes 136. The cover 134 is wrapped around the flange 140 and retained thereby when projected into the trough 84, as shown at the left side of FIG. 9.

As shown in FIGS. 5–11, the twin shoulder belts 112 and 114 connect through the dividing bracket 110 (FIG. 6) to the belt 106. The latter extends beneath the rigid structure 78 and through a front opening 146 and the rear opening 98. It passes through a flat bracket 148 (FIGS. 6 and 11) prior to exiting through the front opening 146 (FIGS. 6 and 10), wherein it may be retained in position by a serrated surface 150 (FIG. 10), serving as a tension adjuster on a cross member 152 which is pivotally mounted on a pin 154 (FIG. 11) between oppositely disposed side walls 156 of the bracket 148. A coil spring 158 operatively connected between the cross member 152 and the pin 154 retains the serrated surface 150 in a gripping engagement against the belt 106 until a shoulder adjustment pull strap 160 extending through the front opening 146 is pulled forward to pivot the cross member 152 and thereby release the single seat belt 106 and permit it to be pulled to tighten the shoulder belts 112 and 114 around the child. The pull strap 160 is mounted around a bar 162 connected to forward edges of the cross member 152 by levers 164. A belt tab 166 (FIG. 6) is secured at the end of the belt 106 to facilitate the pulling-to-tighten process.

Referring now more particularly to FIGS. 12–17, there is shown therein a fold-up head support latch mechanism 168 which is preferably provided in accordance with the principles of the present invention to interconnect the upper movable head cushion assembly 66 to the back panel 56. The latch mechanism 168 is adapted to be activated in a manner hereinafter to be more fully described by a nylon pull strap 170 which is adapted to extend forward in an exposed access position when the upper cushion assembly 66 is in its adult mode position.

As best shown in FIG. 5, the upper end of the back panel is formed with flanges 172 and 174 at opposite sides and the fold-up head support latch mechanism 168 is mounted on one flange 172, while a further head support latch mechanism 176 of a different type, as will be explained, is mounted on the other flange 174.

Figures 12, 16:
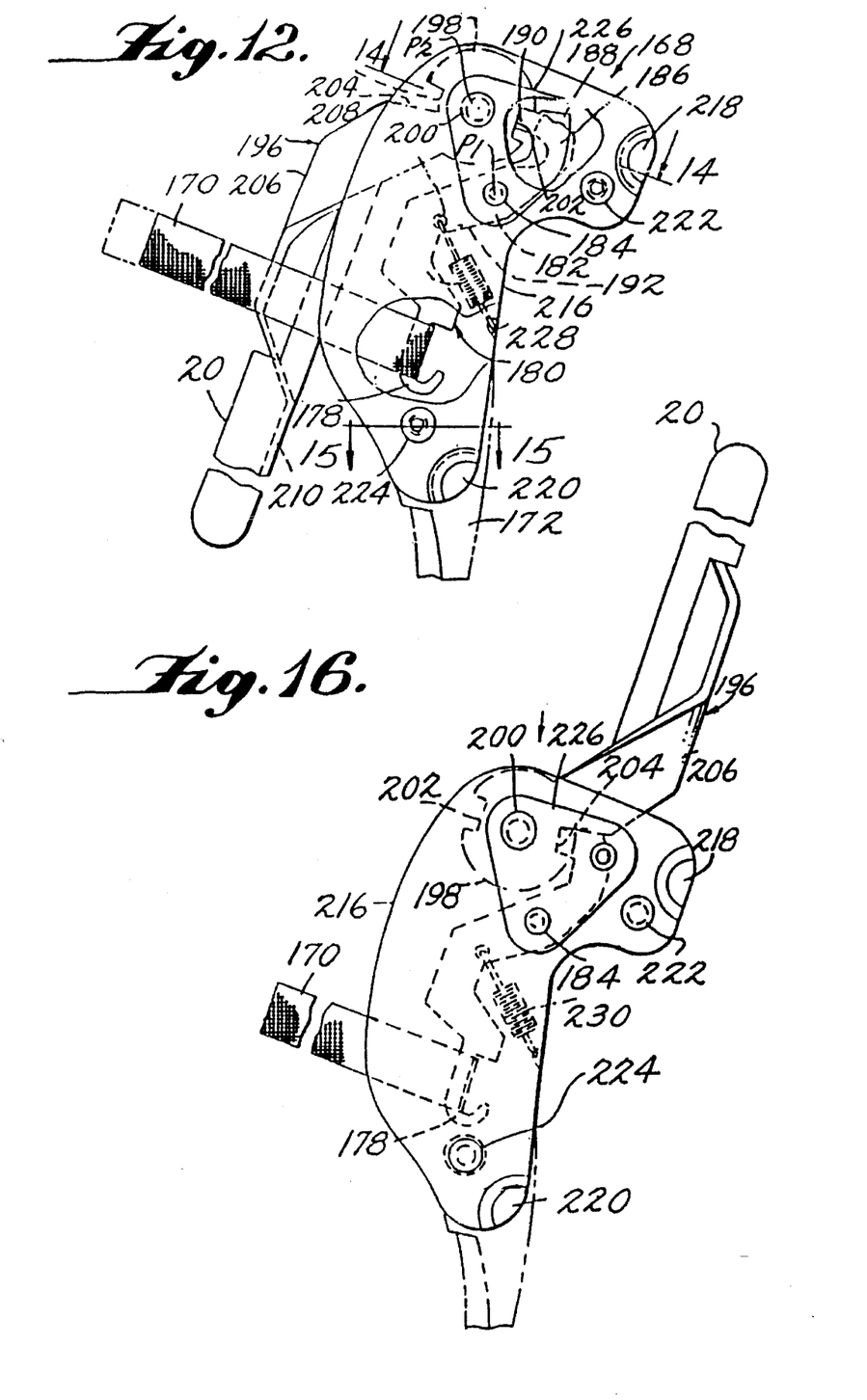
FIG. 12 is an enlarged side elevational view of one latch mechanism in the child's seat module in one operational position.
FIG. 16 is a view similar to FIG. 12 illustrating the one latch mechanism in a second operational position.

As shown in FIG. 12, the disengaging nylon pull strap 170 is connected to a hook or loop 178 which is formed on the lower end of a first latch 180. The latch 180 is pivotally mounted at central portion 182 thereof on a fixed rivet 184 defining a pivot axis. The latch 180 may be referred to as having a substantially "sea horse" shape, in that the upper body portion 186 thereof, above the rivet 184, includes a head 188 having a nose projection 190 formed thereon, for a purpose to be described. The lower body portion 192 has a spring mounting hole 194 formed therein a predetermined spaced distance from the rivet 184.

A head support latch cam 196 includes a round body segment 198 rotatably mounted on a fixed rivet 200 defining a pivot axis. A pair of oppositely disposed notches 202 and 204 are formed in the periphery of the round body segment 198, with a contoured leg segment 206 including a surface 208 aligned with a side of the notch 204 and extending therefrom substantially radially outward from the body segment 198 adjacent the notch 204. An end portion 210 of the leg segment 206 is secured in any suitable manner; such as by welding, to one side of a rigid structure 212 forming an interior part of the cushion assembly 64 the exterior of which is formed by covered cushions 214 (see FIG. 5). As shown in FIG. 12, the nose projection 190 of the latch 180 is adapted to mount in the notch 202 when the rigid structure 212 is down.

Each of the rivets 184 and 200 is mounted through two spaced apart hinge plates 216, such that the latch 180 and the latch cam 196 are rotatable intermediate the two hinge plates 216. The latter are spaced apart by a pair of bosses 218 and 220 (FIGS. 4, 6 and 7). A pair of shoulder bolts 222 and 224 serve to secure the hinge plates 216 to the side flange 172.

A triangular shaped boss 226 is formed on each hinge plate 216, for the mounting therethrough of the rivets 184 and 200. A notch 228 is formed on an edge of one of the hinge plates 216. A coil spring 230 is mounted between the notch 228 and the mounting hole 194 formed in the latch 180, serving to urge the nose projection 190 into the notch 202 of the latch cam 206, as seen in FIGS. 12 and 13.

When it is desired to bring the upper cushion assembly 66 into its child mode position, the nylon pull strap 170 is pulled outwardly. This acts on the loop 178 of the latch 180 against the force of the spring 230 to pivot the latch 180 about the rivet 184 in a clockwise direction, as related to FIG. 12, thereby releasing the nose projection 190 from the notch 202 of the latch cam 196. This permits the manual opening up of the upper cushion assembly 66 about its pivot axis, until the nose projection 190 esters the notch 204, upon the release of the pull strap 170, as shown in FIGS. 16 and 17.

Figure 13:
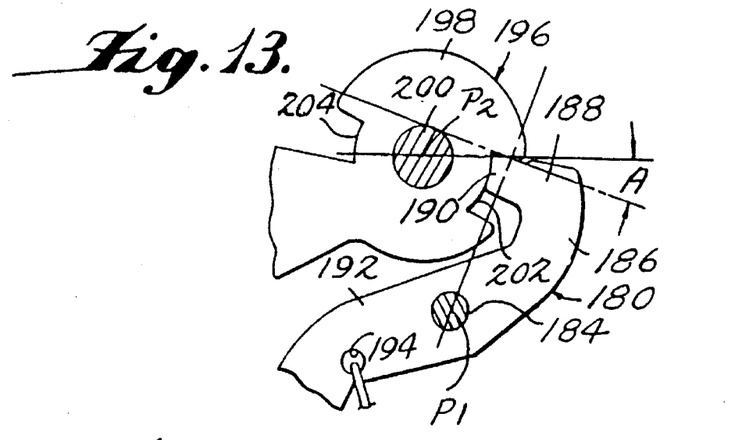
FIG. 13 is an enlarged view of a portion of the latch mechanism shown in FIG. 12.
Figure 14:
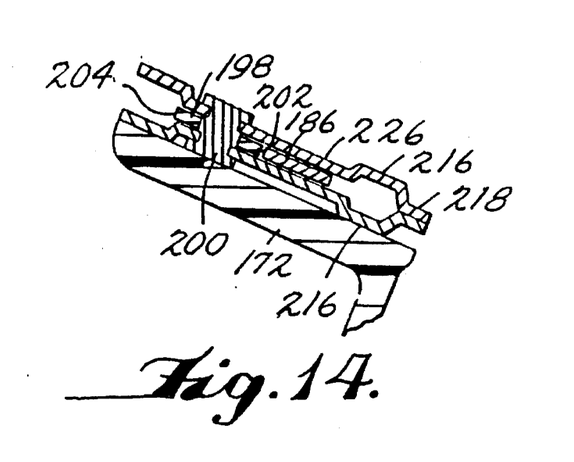
FIG. 14 and 15 are enlarged fragmentary cross-sectional views taken along the respective lines 14—14 and 15—15 of FIG. 12.
Figure 15:
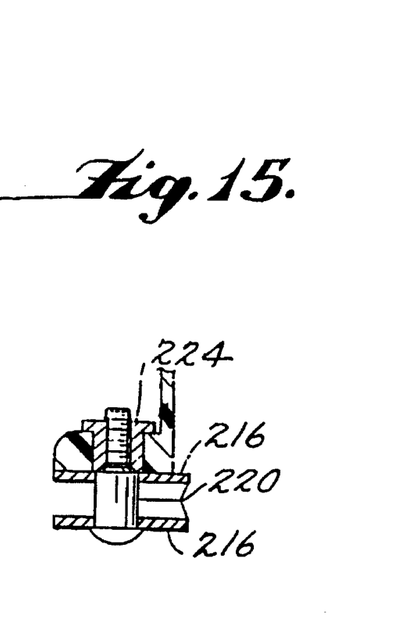
Figure 17:
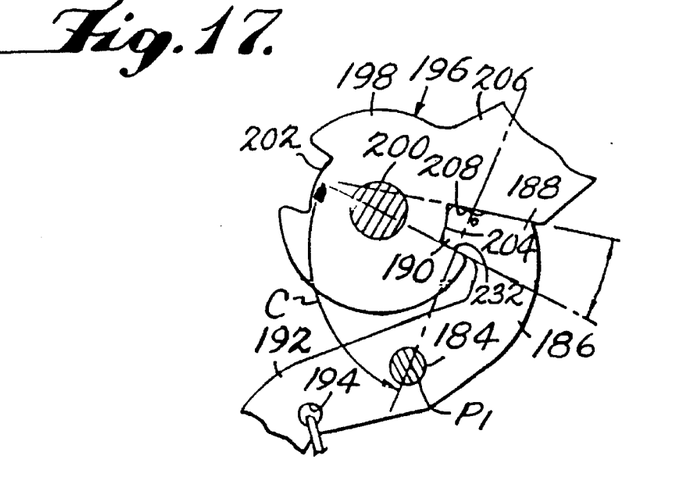
FIG. 17 is a view similar to FIG. 13 of the latch mechanism shown in FIG. 14.

As may be noted more particularly in FIGS. 13 and 17, there is a stepped relationship between the top surfaces of the nose projection 190 and the head 188 of the latch 180. Specifically, for the most effective interconnection between the top surface of the nose projection 140 and the abutting surface of the notch 202, the mating line is preferably at an angle A on the order of 20 degrees below horizontal outward of the round body segment 198, as shown in FIG. 13 at approximately the center of the contacting surfaces, when the head cushion assembly 66 is in its adult mode position. As illustrated in FIG. 17, for the most effective interconnection between the top surface of the head 188 and the abutting surface 208 of the latch cam leg segment 206, with the nose projection 190 in the notch 204, the wedge angle defined by angle B is preferably at an angle on the order of 15 degrees for a "no-chuck" or no-play condition when the head cushion assembly 66 is in its child mode position. The mating surface shown as 232 is preferably at an angle C of between 90 and 97 degrees relative to two lines drawn from pivot centers 184 and 200 intersecting at substantially the midpoint of the mating surface 232.

Referring now to FIGS. 18–23, the head support latch mechanism 176 includes a, so-called, inertia latch 234 pivotally mounted directly above a center of gravity portion thereof on a fixed rivet 236, on the side flange 174, between a pair of hinge plates 238 comparable to the hinge plates 216. The hinge plates 238 are secured to the side flange 174 by a pair of shoulder bolts 240 and 242, and are accurately spaced apart by bosses 244 and 246.

The inertia latch 234 includes a body segment 248 having an arcuate-shaped edge 250 formed on an upper side thereof, with a latching finger 252 formed adjacent the other end of the arcuate-shaped edge 250. The inertia latch is pivotal about a rivet 254 between the hinge plates 238, within the confines of oppositely disposed bosses 256 formed on the hinge plates 238.

A second head support latch cam 258 includes a round body segment 260 secured at its center by a fixed rivet 262 on the side flange 174 opposite the head support latch cam 196. A step 264 is formed in an upper portion of the periphery of the round body segment 260, with a leg segment 266 extending substantially radially outward from the body segment adjacent the step 264. A contact surface 268 is formed on the upper side of the leg segment 266. An outermost portion 270 of the leg segment 266 is secured in any suitable manner, such as by welding, to the adjacent side of the rigid structure 212, opposite the head support latch cam 196.

Figures 18, 19, 20, 21:
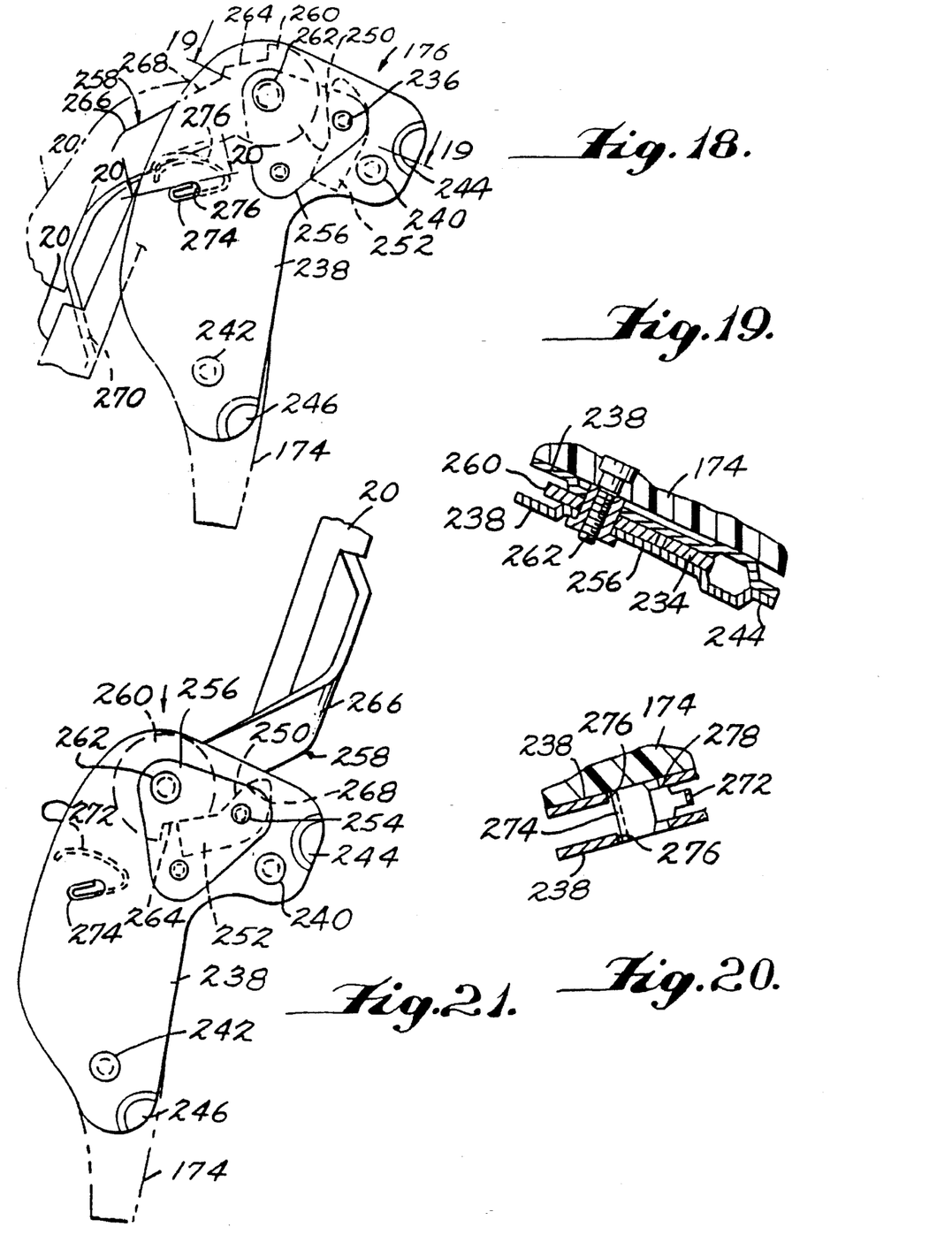
FIG. 18 is an enlarged side elevational view of a second latch mechanism for the child's seat module in one operational position.
FIGS. 19 and 20 are enlarged fragmentary cross-sectional views taken along the respective lines 19—19 and 20—20 of FIG. 18.
FIG. 21 is a view similar to FIG. 18 illustrating the second latch mechanism in another operational position.
Figure 24:
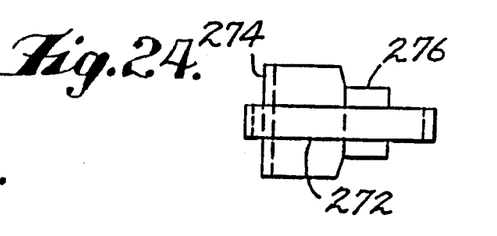
FIGS. 24–26 are enlarged top, side and end views, respectively, of one component of the latch mechanism.
Figure 25:
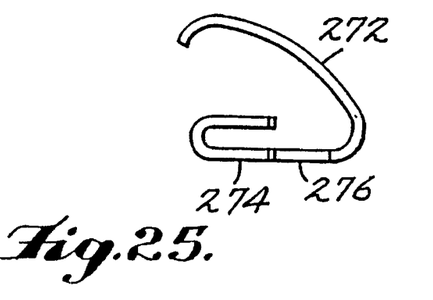
Figure 26:
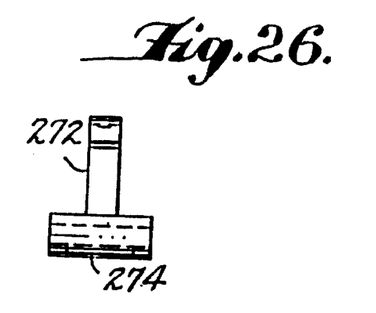

In its adult mode position, the latch cam 258 is retained in position by having compressed a substantially arcuate-shaped leaf spring 272 extending from a fixed base 274 having oppositely disposed ends thereof mounted in openings 276 formed in the respective hinge plates 238. A connector portion 278 of the leaf spring 272 with the base 274 is of a width which serves as a guide for the leaf spring between the hinge plates 238 (FIG. 20). The details of the spring assembly is shown in FIGS. 24–26).

When it is desired to bring the head cushion assembly 66 into its child mode position, and the nylon pull strap 170 is pulled outwardly, as discussed above relative to the latch 180 (FIGS. 12 and 13), releasing the nose projection 190 from the notch 202 of the latch cam 196, the previously compressed leaf spring 272 serves to project the leg segment 266 and, hence, the rigid structure 212 of the head cushion assembly 66 outwardly, into substantially the position shown by phantom lines in FIG. 18, ready to be rotated into the upright position shown in FIGS. 16 and 21.

Figure 22:
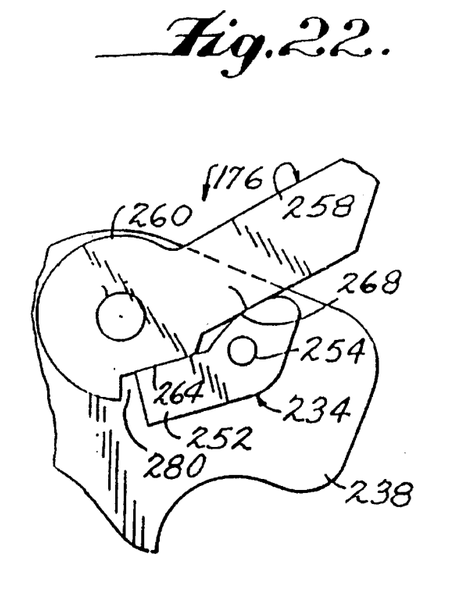
FIG. 22 is a view similar to FIG. 13 of the second latch mechanism shown in FIG. 21.
Figure 23:
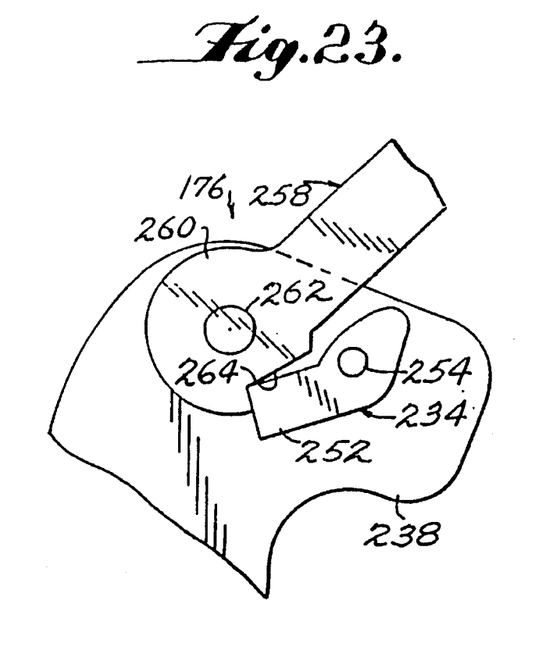
FIG. 23 is a view similar to FIG. 22 in a further operational position.

Referring now to FIGS. 21 and 22, it may be noted that, as the head cushion assembly 66 is being raised in a clockwise direction, the contact surface 268 of the second head support latch cam 258 engages the arcuate-shaped edge 250, causing the latching finger 252 to enter the step 264. It is noted in FIG. 22 that a space 280 exists between the end of the latching finger 252 and the bottom of the step 264, while the head cushion assembly 66 is in the child mode position. In the event a quick stop occurs, i.e., a forward deceleration exceeding substantially 0.75 times the force of gravity, the head cushion assembly 66 and, hence, the head support latch cam may rotate forward, through the space 280, as shown in FIG. 23, with the end of the latching finger 252 contacting the bottom of the step 264, thus assuring that the head cushion assembly 66 will remain in its child mode position.

It thus will be seen that the objects of this invention have been fully and effectively accomplished. It will be realized, however, that the foregoing preferred specific embodiment has been shown and described for the purpose of this invention and is subject to change without departure from such principles. Therefore, this invention includes all modifications encompassed within the spirit and scope of the following claims.

What is claimed is:

1. In a vehicle seat comprising a frame assembly for securement within a vehicle including a seat frame assembly and a seat back frame assembly operatively connected with said seat frame assembly so as to be capable of being disposed in a fixed operative position with respect to said seat frame assembly, a seat cushion carried by said seat frame assembly in a position to enable an adult occupant of the vehicle to sit thereon in an operative position, side cushions carried by said seat back frame assembly in positions to be engaged by opposite sides of the back of an adult seat occupant sitting on said seat cushion in said operative position with said seat back frame assembly in said fixed operative position, said side cushions being spaced apart a distance sufficient to define a child receiving space therebetween of a size to enable a child to be disposed therebetween, a plurality of cushion assemblies mounted on said frame assembly including a movable cushion assembly mounted on said frame assembly for movement between (1) an adult mode position wherein said plurality of cushion assemblies are disposed within the space between the side cushions and provide adult back cushions for engaging the back of an adult seat occupant sitting on the seat cushion, and (2) a child mode position wherein said movable cushion assembly extends from the space between the side cushions and said plurality of cushion assemblies including said movable cushion assembly provides (A) a cushioned child's seat extending from the bottom of the space in overlying relation to the seat cushion, (B) a cushioned child's seat back extending upwardly from said cushioned child's seat within the space between the side cushions and (C) a cushioned child's head support above the cushioned child's seat back, a child's seat belt assembly disposed in operative relation with said seat back frame assembly and extending forwardly of said cushioned child's seat back for extension over the shoulders of a child sitting on the cushioned child's seat, said movable cushion assembly including a rigid seat structure and a connecting structure between said rigid seat structure and said seat back frame assembly enabling the movable cushion assembly to be moved between said adult mode and said child mode positions, said rigid seat structure providing a rigid anchor point for the child's seat belt assembly between the legs of a child sitting on said cushioned child's seat, the improvement which comprises an upper head cushion assembly provided as one of said plurality of cushion assemblies, said head cushion assembly comprising a rigid head structure, cushioning material carried by said rigid head structure and a releasable latching structure between said rigid head structure and said seat back frame assembly, said releasable latching structure being constructed and arranged to enable said head cushion assembly (1) to be releasably fixed in a child mode position above said seat back frame assembly and the upper extent of said side cushions carried thereby so that said rigid head structure and cushioning material carried thereby provide said cushioned child's head support and (2) to be moved and releasably fixed into an adult mode position disposed between an upper extent of said side cushions forwardly of said seat back frame assembly so that said rigid head structure and cushioning material carried thereby define an upper extent of the adult back cushions for engaging the back of an adult seat occupant sitting on said seat cushion.

2. The combination as defined in claim 1 wherein said releasable latching structure of said improvement includes structure defining a pivotal connection between said rigid head structure and said seat back frame assembly, the structure defining said pivotal connection being constructed and arranged to enable said head cushion assembly to pivot about a fixed generally horizontally extending axis between said child mode and adult mode positions.

3. The combination as defined in claim 2 wherein the releasable latching structure of said improvement further comprises a latch cam pivotally mounted at one side of a back panel forming a part of said seat back frame assembly, said latch cam having a leg extension secured to a side of said rigid head structure and a pair of oppositely disposed notches formed thereon, a latch pivotally mounted on said one side of said back panel and having a nose projection formed thereon, a spring operatively connected to said latch to urge said nose projection into one of said pair of oppositely disposed notches when said head cushion assembly is in said adult mode position and into the other of said notches when said head cushion assembly is in said child mode position, and a release structure operatively connected to said latch for manually releasing said nose projection from said respective notches against the force of said spring to permit manual movement of said head cushion assembly from one of said positions to the other.

4. The combination as defined in claim 1 wherein the seat back frame assembly of said vehicle seat includes a seat back frame structure and a rigid back panel fixed to said seat back frame structure forwardly thereof between said side cushions, said connecting structure being between said rigid seat structure and said rigid back panel, and said releasable latching structure of said improvement being between said rigid head structure and said rigid back panel so that said rigid back panel, said plurality of cushion assemblies and said child's seat belt assembly constitutes a modular construction.

5. The combination as defined in claim 1 wherein the plurality of cushion assemblies include a removable cushion pad assembly including a back section detachably fixed to said seat back support assembly forwardly thereof between said side cushions to provide therewith said cushioned child's seat back and a seat section hingedly connected with said seat back section detachably fixed to said movable cushion assembly to provide therewith said cushioned child's seat.

6. The combination as defined in claim 5 wherein portions of said child's seat belt assembly which are capable of extension over the shoulders of a child sitting on the cushioned child's seat and between the legs of the child are deployable in a booster mode position covered by said removable cushion pad assembly when said plurality of cushion assemblies are in the child mode position thereof enabling the cushioned child's seat, seat back and head support provided to function as a booster seat for a larger child capable of being restrained by an adult seat belt assembly provided in association with said vehicle seat.

\* \* \* \* \*